(12) United States Patent  
Monraz et al.

(10) Patent No.: US 8,626,700 B1
(45) Date of Patent: Jan. 7, 2014

(54) CONTEXT AWARE DEVICE EXECUTION FOR SIMULATING NEURAL NETWORKS IN COMPUTE UNIFIED DEVICE ARCHITECTURE

(75) Inventors: Xavier Monraz, San Diego, CA (US); Jeremy M. Lewi, Burlingame, CA (US)

(73) Assignee: The Intellisis Corporation, San Diego, CA (US)

( * ) Notice: Subject to any disclaimer, the term of this patent is extended or adjusted under 35 U.S.C. 154(b) by 183 days.

(21) Appl. No.: 13/097,615

(22) Filed: Apr. 29, 2011

Related U.S. Application Data

(60) Provisional application No. 61/329,995, filed on Apr. 30, 2010.

(51) Int. Cl.
*G06F 17/00* (2006.01)
*G06N 7/00* (2006.01)
*G06N 7/08* (2006.01)

(52) U.S. Cl.
USPC .............................................. 706/59; 706/16

(58) Field of Classification Search
None
See application file for complete search history.

(56) References Cited

U.S. PATENT DOCUMENTS 5,819,245 A * 10/1998 Peterson et al. ................ 706/16

* cited by examiner

*Primary Examiner* — Kakali Chaki
*Assistant Examiner* — Luis Sitiriche
(74) *Attorney, Agent, or Firm* — Pillsbury Winthrop Shaw Pittman LLP (57) ABSTRACT

A system, method, and computer program product are provided for efficient allocation of attributes corresponding to neurons or connections of multiple types using a common data structure. A map file is generated by a pre-processor in order to map an attribute of a neuron or connection to a particular location within the common data structure based on a type associated with the neuron or connection, while allowing a neuron or connection of a different type to map its own attribute to that same particular location. Additionally, kernel code can be written to reference attribute names made available by the map file in order to provide reusability of code.

8 Claims, 8 Drawing Sheets

CONTEXT AWARE DEVICE EXECUTION FOR SIMULATING NEURAL NETWORKS IN COMPUTE UNIFIED DEVICE ARCHITECTURE

CROSS-REFERENCE TO RELATED APPLICATIONS

The present application claims the benefit of U.S. Provisional Application No. 61/329,995, filed Apr. 30, 2010, entitled "Context Aware Device Execution for Simulating Neural Networks in Compute Unified Device Architecture", which is incorporated herein by reference in its entirety.

BACKGROUND OF INVENTION

1. Field of the Invention

The present invention relates generally to Single Instruction Multiple Data ("SIMD") and Single Instruction Multiple Thread ("SIMT") architectures and, in particular, processing of neural networks using a SIMD/SIMT architecture.

2. Description of the Background Art

Improving resource utilization of algorithms for SIMD architectures requires careful consideration of memory access patterns. In order to maintain a high level of parallelism, each resource has to maintain uniform reads and writes at any given instant. Additionally, conditional operations based on the content of memory need to be structured in a manner that reduces the divergence of processes or threads that would result in serialization of operations.

Divergence in a SIMD/SIMT architecture refers to the divergence of two or more processors or threads. Divergence occurs when a set of processors or threads executing simultaneously encounters an instruction and/or data which causes a subset of threads to branch into a different execution path than the other threads. As a result, the threads are no longer synchronized (i.e., executing the same instructions) and can therefore not be run simultaneously on a SIMD/SIMT architecture. These considerations should be kept in mind when parallelizing operations associated with neural network processing.

Accordingly, what is desired is an efficient memory structure for maintaining high parallelization of neural network operations and improving utilization of compute resources in a SIMD architecture.

SUMMARY OF INVENTION

Embodiments of the invention include a method comprising generating a map file from a type definition associating a neuron or connection with an attribute, the map file configured to allocate a position in a buffer to the attribute and to allocate the position in the buffer to an additional attribute of an additional neuron or connection of a different type, and building executable code from kernel code and the map file.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

One skilled in the relevant arts will appreciate that the techniques described herein can be applied to a variety of SIMD architectures, including the SIMT architecture provided by the Compute Unified Device Architecture ("CUDA") developed by NVIDIA CORPORATION of Santa Clara, Calif. Reference to either SIMD or SIMT in this context is therefore intended to describe non-limiting applicability to a wide range of SIMD and other architectures, and is not limited to applications specific to CUDA.

At a very basic level, a neural network operates essentially as a set of discrete elements (neurons) that are connected to one another. Each neuron is typically connected to a small fraction of all the neurons in the network. A set of states and parameters, potentially changing with time, are associated with each neuron and connection. This association can be expressed by saying that each neuron is described by some vector, $\vec{r}_j$, where the subscript identifies the neuron. Similarly, each connection is described by its own vector $\vec{w}_k$ where the subscript k identifies the connection.

In a neural network, each connection is directed. This means that, for each connection, one neuron is designated as the start of the connection ("pre-synaptic neuron") and the other neuron is designated as the terminal for the connection ("post-synaptic neuron"). The pre- and post-synaptic nomenclature is obtained from the neuroscience community, and refers to the fact that biological molecules (neuro-transmitters) travel from the pre-synaptic neuron to the post-synaptic neuron. A neural network is therefore defined by the following data:

$R=\{\vec{r}_i: i \in 1, 2, \ldots, N_r\}$ $W=\{\vec{w}_m: m \in 1, 2, \ldots N_w\}$  $C=\{(i, j, m): m \in 1, 2, \ldots, N_w\}$ Here, $N_r$ is the number of neurons in the network and $N_w$ is the number of connections. R is the set of state vectors describing the neurons. W is the set of state vectors describing the connections. C is a set of ordered triplets. Each of these triplets describes one connection in the network. The first value in this triplet, i, specifies the index of the pre-synaptic neuron. j is the index of the post-synaptic neuron. m is an index which identifies the connection, i.e. m has a unique value for each ordered triplet (i,j,m). Each of these indexes corresponds to a state vector $\vec{r}_i$, $\vec{r}_j$, $\vec{w}_m$ which contains the states and parameters of the pre-synaptic, post-synaptic and connection respectively. In accordance with an embodiment of the present invention, there is a one-to-one association between the weights and the connections. Each connection has one weight associated with it.

A neural network operates by iteratively updating the state vectors for the neurons and connections. Each iteration is referred to as an epoch or time step. At each time step we update the state vector for each neuron j by evaluating some function $f_j$ for that neuron. After updating all neurons, each connection m is updated by evaluating some function $g_m$. Input is provided to the network by allowing the function $f_j$ for some neurons to depend on an input signal $\vec{I}$. The key idea of a neural network is that the connections determine which neurons directly influence the state vectors of other neurons. Furthermore, this interaction is modulated by the state values of that connection, $\vec{w}_m$. This is described in more detail below.

At each time step, the state vector for neuron j is updated by executing some function $f_j$. The output of this function is the new value for the neuron's state vector, $\vec{r}_j$. This function depends on the current value of the state vector $\vec{r}_j$ as well as all connections (and the associated pre-synaptic neuron) for which neuron j is the post-synaptic neuron. We can therefore write the update for neuron j as $\vec{r}_j \leftarrow f_j(\vec{r}_i, C_j)$ where $C_j = \{(\vec{r}_i, \vec{w}_m): \text{for all m such that } (i, j, m) \in C\}$ The set $C_j$ denotes the set of all pairs of pre-synaptic state vectors $\vec{r}_i$ and connection state vectors $\vec{w}_m$ for which there exists a connection from neuron i to neuron j. The arrow means the value of $\vec{r}_j$ is replaced with the result of evaluating $f_j$.

The function $f_j$ can be almost any function that satisfies the following constraints. For each connection, the function $f_j$ can only depend on some intermediary values, $\vec{a}_m$, which are a function only of $(\vec{r}_i, \vec{r}_j, \vec{w}_m)$ for connection m. Furthermore, it must be possible to serially accumulate the contributions to $\vec{r}_j$ from all connections using a fixed amount of memory which is independent of the number of connections. This is described more exactly with the following pseudo code for $f_j$ Function $f_j$
  For each $(\vec{r}_i, \vec{w}_m) \in C_j$
    $\vec{a}_j \leftarrow \mu_m(\vec{r}_i, \vec{r}_j, \vec{w}_m)$
    $\vec{b}_j \leftarrow \nu_j(\vec{a}_j, \vec{b}_j)$
  Return $\xi_j(\vec{r}_j, \vec{b}_j)$ Here $\mu_m$, $\nu_j$ and $\xi_j$ are some vector-valued functions which return vectors. $\vec{a}_j$ is the contribution to neuron j from connection m and pre-synaptic neuron i. $\vec{b}_j$ quantifies the total effect of all contributions. The only restriction on $f_j$ is that it must be possible to compute the effect of all contributions to neuron j by processing each connection one by one. After processing each connection, $\vec{b}_j$ is updated, and is sufficient to describe the contributions of all connections processed so far. The "For" loop therefore accumulates the contributions of all connections. After iterating over all connections terminating on neuron j, the new value for $\vec{r}_j$ is computed by evaluating function $\xi_j$. This function depends on the current state j, $\vec{r}_j$, and the combined effect of all of neuron j's connections as measured by $\vec{b}_j$. As a result, this demonstrates that the amount of memory needed to implement $f_j$ is independent of the number of connections.

In the pseudo code for $f_j$, no order for processing the connections is given. However, for some functions/connections the connections might be processed in a specific order.

A fundamental feature of neural networks is that they can learn and adapt. Mathematically, this means the states and parameters of the neurons and connections can change with time as a function of the input and their dynamics. For the neuron, learning involves choosing appropriate functions $\mu_m$, $\nu_j$, and $\xi_j$. For connections, learning involves letting the state vector $\vec{w}_m$ change with time. In accordance with an embodiment of the present invention, at each time step the connection is updated by:

$\vec{w}_m \leftarrow \psi_m(\vec{r}_i, \vec{r}_j, \vec{w}_m)$

Here $\psi_m$ is some function which determines how the connection changes. The only restriction on $\psi_m$ is that it is a function of the connection, $\vec{w}_m$ and the pre and post-synaptic neurons $(\vec{r}_i, \vec{r}_j)$.

In the description of a neural network above, each neuron and connection has a unique set of functions to describe its evolution. In practice, most networks contain a few types of connections and neurons. Each type of neuron or connection would be associated with a particular function $f$ for the neuron type or $\psi$ for the connection.

Applying a neural network to a problem, such as classifying images, entails choosing suitable quantities to encode in the state vectors $(\vec{r}_i, \vec{r}_j, \vec{w}_m)$ as well as the appropriate functions $\mu_j$, $\nu_j$, $\xi_j$, and $\psi_m$ for updating these quantities.

Neural networks provide a very general framework in which a multitude of algorithms may be chosen depending on the choice of functions and the quantities encoded in the state vectors. These include, by way of example and not limitation, slow feature analysis, ICA, PCA, and sparse coding. The functions need not be deterministic.

The networks described above are very heterogeneous (i.e. they contain many different types of neurons and connections). Each connection and neuron has its own set of equations (i.e. the functions $\mu$, $\nu$, $\xi$) which are used to update the neuron/connection. Similarly each connection and neuron might store different numbers and types of parameters (i.e. the state vectors $\vec{r}_j$ and $\vec{w}_m$ would have different lengths and store different values at each entry depending on the neuron/connection type).

Heterogeneity provides an impediment to maximizing the usage of computational resources of a SIMD architecture. A SIMD architecture simultaneously executes a single instruction on multiple data. To illustrate these challenges, an illustrative example is provided in order to consider how a homogenous network with one type of neuron and one type of connection could be parallelized for a SIMD architecture.

Exemplary high-level pseudo code for running a homogeneous neural network is provided below. The subscripts on the functions h, $\psi$, g, k are deleted in the pseudocode because the functions are assumed to be the same for all instances, since the network is assumed to be homogenous.

For each $\vec{r}_j \in R$
  For each $(\vec{r}_i, \vec{w}_m) \in C_j$
    $\vec{a}_j \leftarrow \mu(\vec{r}_i, \vec{r}_j, \vec{w}_m)$
    $\vec{w}_m \leftarrow \omega(\vec{r}_i, \vec{r}_j, \vec{w}_m)$
    $\vec{b}_j \leftarrow \nu(\vec{a}_j, \vec{b}_j)$
  $\vec{r}_j \leftarrow \xi(\vec{r}_j, \vec{b}_j)$ To parallelize this code, iterations of the outer-most loop (which is executed once for each neuron) are executed in parallel. This means that $N_p$ neurons are processed in parallel, where $N_p$ is the number of threads or processors available in a target architecture.

The above implementation presents a challenge for SIMD architectures, as each neuron j will have a variable number of incoming connections (i.e. the number of connections, $|C_j|$, will vary for each neuron). As a result, the number of iterations for the inner loop would vary for each neuron, such that one thread may have to execute the inner loop five times while another thread would have to execute the inner loop ten times. As a result, it would no longer be possible to maintain synchronization of the two threads, presenting implementation problems for a SIMD architecture.

One way to solve this problem is to sort the neurons by the number of connections and to simultaneously process all neurons with a given number of connections. This is illustrated by the following example pseudo-code:

For $N_c=0, 1, \ldots, \max_j |C_j|$
  $R_{N_c} = \{\vec{r}_j : \text{where } |C_j|=N_c\}$
  For $\vec{r}_j \in R_{N_c}$
    For $(\vec{r}_i, \vec{w}_m) \in C_j$
      $\vec{a}_j \leftarrow \mu(\vec{r}_i, \vec{r}_j, \vec{w}_m)$
      $\vec{w}_m \leftarrow \psi(\vec{r}_i, \vec{r}_j, \vec{w}_m)$
      $b_j \leftarrow \nu(\vec{a}_j, \vec{b}_j)$
    $\vec{r}_j \leftarrow \xi(\vec{r}_j, \vec{b}_j)$ In the outer loop, every possible value of incoming connections for the network is considered. In the second loop iterating over $R_{N_c}$, all neurons having $N_c$ incoming connections are considered. Since all such neurons have the same number of incoming connections, the inner most loop over $C_j$ would have to be executed the same number of times. This provides the ability to parallelize the second loop, as for a given value of $N_c$, each thread or processor in a SIMD architecture would process a different neuron with $N_c$ incoming connections. Since the innermost loop would be executed the same number of times for all threads, and the functions are the same for all threads, all threads would be synchronized.

The proposed solution, discussed in detail herein, goes well beyond this basic architecture in order to efficiently handle heterogeneous neural networks on SIMD/SIMT platforms. Context Aware Device Execution ("CADE") is an architecture comprising several elements, in accordance with an embodiment of the present invention, including data structures for efficient representation of neural networks on SIMD architectures, mechanisms for accessing these data structures within the code (or "kernels", functions which are executed in parallel on different data in a SIMD/SIMT architecture) executed on each processor in a SIMD/SIMT architecture, a modular organization of the various source files and build processes in order to facilitate reprogrammability and the definition of new elements, and an enhanced or optimal ordering of neurons and connections to maximize the utilization of compute resources on a SIMD architecture.

II. CUDA Architecture

In an embodiment, an NVIDIA Graphics Processing Unit ("GPU") performs General Purpose GPU ("GPGPU") computation through CUDA. CUDA presents the GPU as a hierarchical device composed of cores, multiprocessors, and ultimately a grid. To take advantage of the given hardware model, the software model used on top of these devices has to conform to CUDA's SIMT paradigm.

The lowest level of managed execution in CUDA is a block. A multiprocessor processes a number of blocks which each contain a number of threads. A multiprocessor executes each block independently of the rest and, similarly, a block is split into groupings of threads termed "warps". The threads of a warp are executed in parallel and, therefore, any divergence within a warp results in serialization of CUDA core operations. Because of the nature of this architecture, significant performance improvements are achieved by minimizing the amount of divergence in a warp. By way of example, and not limitation, in NVIDIA's Fermi architecture, the warp size is 32 threads. Accordingly, any implementation on CUDA in this architecture should be expected not to diverge within every set of 32 threads.

Figure 1:
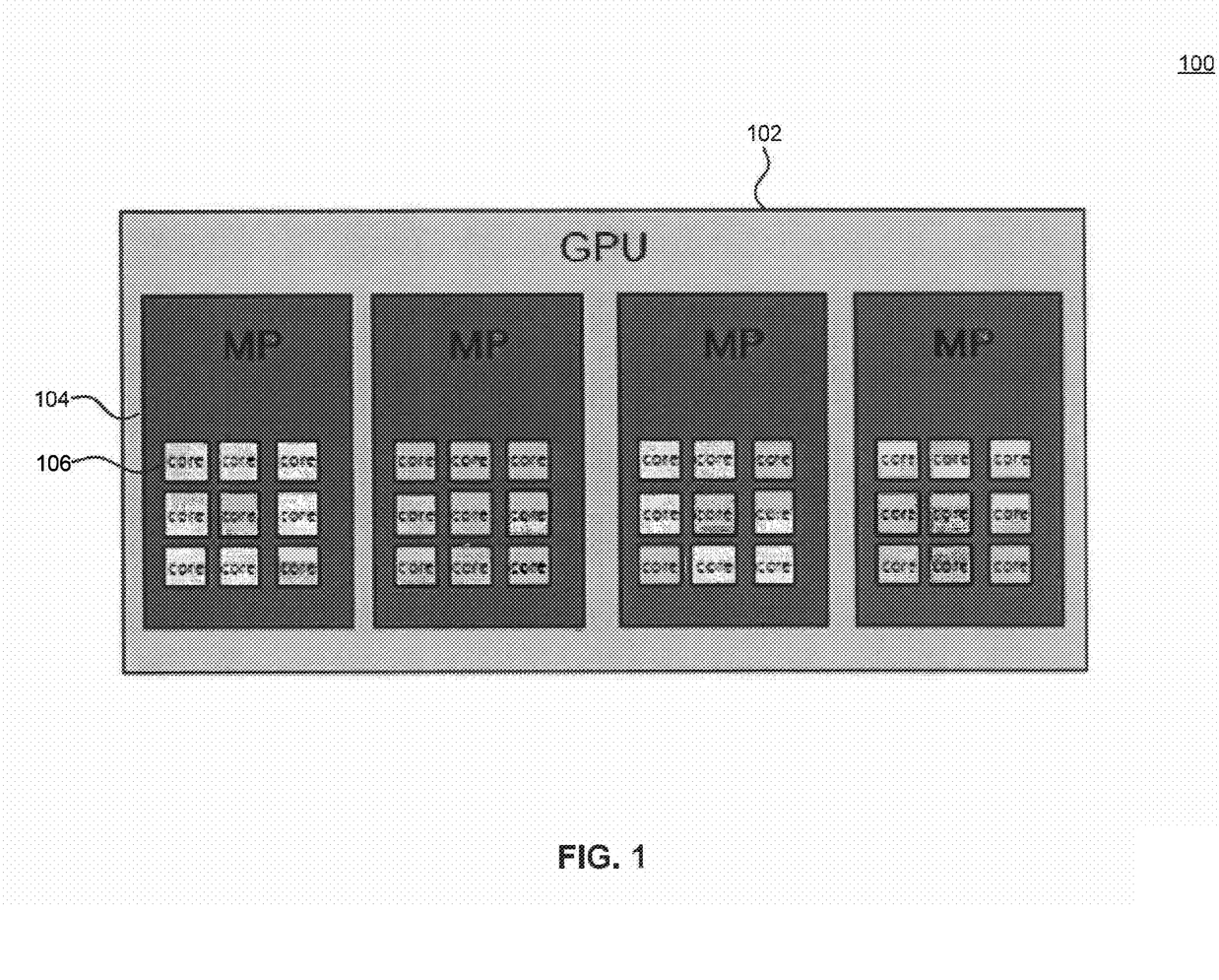
FIG. 1 is a processor architecture illustrating hierarchy of elements of a GPU, in accordance with an embodiment of the present invention.

FIG. 1 is a processor architecture 100 illustrating hierarchy of elements of a GPU 102, in accordance with an embodiment of the present invention. The GPU is comprised of multiprocessors 104, each of which has CUDA cores 106, in accordance with a further embodiment of the present invention.

Software executed in multiprocessors 104 is called a kernel. A kernel tells the device what to do with one specific thread in the entire thread pool, such as what data to access, what mathematical operations to perform, and where to write out results. Further information regarding development on CUDA is found in the "NVIDIA CUDA Programming Guide" from NVIDIA CORPORATION, Santa Clara, Calif. (2010) (http://developer.download.nvidia.com/compute/cuda/1_0/NVIDIA_CUDA_Programming_Guide_1.0.pdf).

There are also preferred access patterns to data to minimize the total number of memory operations to increase throughput. These operations are meant to facilitate keeping the multiprocessors loaded with global data as efficiently as possible. The time it takes to access data in global memory compared to memory on chip is about 2 orders of magnitude. Hiding this global memory latency can only be accomplished by taxing the arithmetic units and loading the global memory as quickly as possible. When bank conflicts occur, memory request operations are queued up to be performed serially which also negatively affects throughput.

III. Naïve Implementation of a Heterogeneous Neural Network in a SIMD Architecture A naïve implementation of a heterogeneous network is to represent it as a homogenous network consisting of super neurons and connections. These super neurons and connections are formed by concatenating together all of the code and data structures for the different types of neurons and connections.

Suppose we have three types of neurons (Type A, Type B, and Type C). Each Type has associated with it a different set of fields. A single state vector $\vec{r}_j$ is defined, capable of representing all neuron Types. In order to handle this, $\vec{r}_j$ has one component for each field of Type A, Type B, and Type C.

Figure 2:
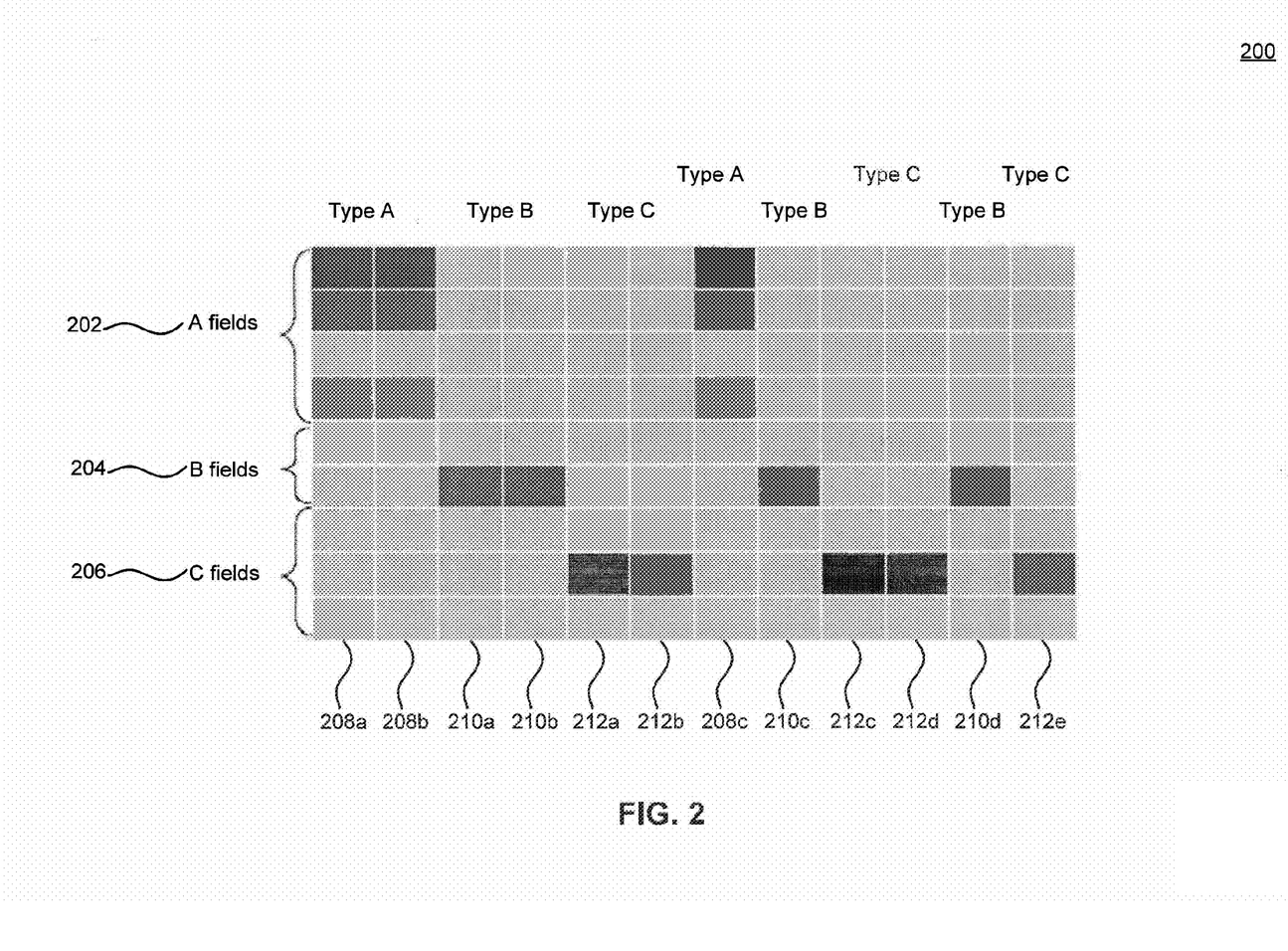
FIG. 2 is a data structure illustrating individual state vectors corresponding to J, each having all of the fields associated with each type, in accordance with an embodiment of the present invention.

FIG. 2 is a data structure 200 illustrating individual state vectors 208a, 208b, 210a, 210b, 212a, 212b, 208c, 210c, 212c, 212d, 210d, and 212e corresponding to $\vec{r}_j$, each having all of the fields associated with each type (e.g., Type A fields 202, Type B fields 204, and Type C fields 206), in accordance with an embodiment of the present invention. Rows 1-4 202 are used by connections of Type A while rows 5-6 204 are used by Type B, and rows 7-9 206 are used by Type C.

The column headings are used to indicate which type each column is an instance of. For example, columns 208a and 208b are instances of Type A. Column 210c is an instance of Type B. Thus, column 208a only uses the first 4 rows because it is an instance of Type A. By way of illustration, all of the columns designated 208 are of Type A, 210 are of Type B, and 212 are of Type C.

Note the matrix of data structure 200 described here provides an abstract representation of the data structure representing the connection and neuron state vectors. In practice there is probably one such matrix for the neurons and a separate one for the connections. Both, however, would have the same abstract structure, in accordance with an embodiment of the present invention. Furthermore, one skilled in the relevant arts would recognize that this matrix could be implemented a number of ways, such as using a set of one-dimensional arrays with one array for each row, a two-dimensional array, or an array of structures with one field in the structure for each row. The precise nature of the data structure 200 of FIG. 2 is therefore provided by way of example, and not limitation.

Similarly, each neuron type has associated with it its own set of functions, e.g. k corresponding to Type A, $k_b$ corresponding to Type B, and k, corresponding to Type C, by way of example and not limitation. A single homogenous k function for all neurons can therefore be created by concatenating the code together as illustrated by the following pseudo-code:

Def k($\vec{r}_j, \vec{b}_j$):
If $\vec{r}_j$ is type A:
   q←$k_A(\vec{r}_j, \vec{b}_j)$
If $\vec{r}_j$ is type B:
   q←$k_B(\vec{r}_j, \vec{b}_j)$ If $\vec{r}_j$ is type C:
   q←$k_A(\vec{r}_j, \vec{b}_j)$
Return q This naïve implementation has two major disadvantages. First, as FIG. 2 shows (see, e.g., the A fields 202 for Type B vectors 210a and 210b), a significant amount of space is wasted in the data structure. In particular, as the number of types increases, an increasing fraction of space in the data structure is wasted. Second, the super functions, such as super function k of the above pseudo-code, end up containing several branch statements, such as the three branch statements in the pseudo-code example. For a given neuron, only one IF statement is executed since each neuron has a single type. In most SIMD architectures, this branching is likely to lead to inefficient implementations which in the worst case provide no speedup over a serial implementation.

In an exemplary embodiment, three parallel processing resources are available, all executing the same super function k as in an exemplary SIMD architecture, with the neuron executing on the first processing resource being of Type A, the neuron on the second processing resource being of Type B, and the neuron on the third processing resource being of Type C. The first processing resource will drop into the IF statement for Type A. On most SIMD architectures, the other processors will have to block while the first processing resource completes its work so that all processing resources can remain synchronized. Similarly, when a second thread of execution operating on the second processing resource enters into the IF statement for Type B, the other two processing resources will block while the second processing resource executes.

To prevent this type of inefficient usage, the neurons should be ordered such that each processor is executing a neuron or connection of the same type, thereby eliminating divergence without the blocking situations caused by this naïve implementation.

IV. Efficient Data Structure

Figure 3:
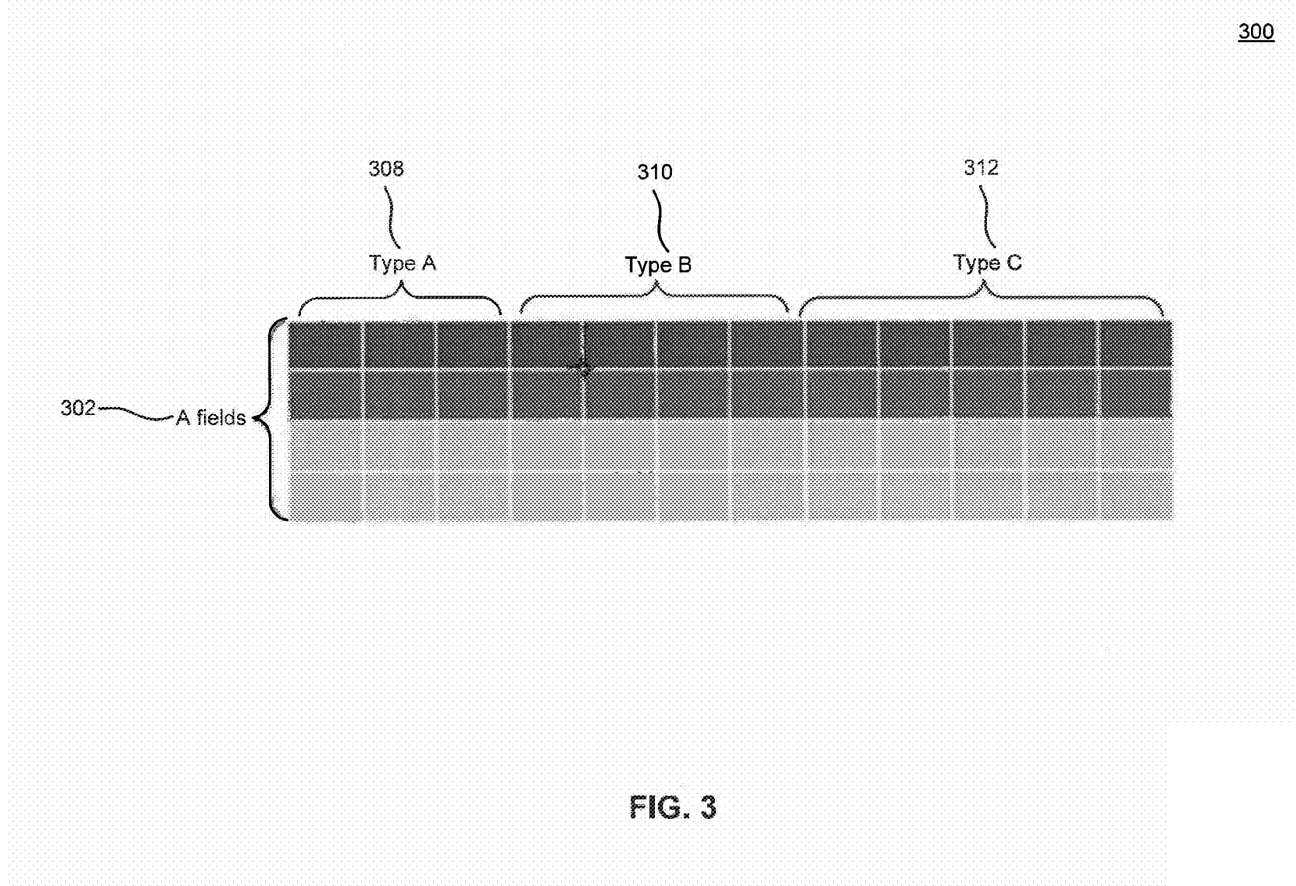
FIG. 3 is an abstract representation of a matrix data structure used to store state vectors for neurons and/or connections, in accordance with an embodiment of the present invention.

CADE provides an approach to efficiently store the state vectors for the connections and neurons, in accordance with an embodiment of the present invention. FIG. 3 is an abstract representation of a matrix data structure 300 used to store state vectors for neurons and/or connections, in accordance with an embodiment of the present invention. As noted above, in a typical application, there would be one such matrix for the neurons and another matrix for the connections.

The contents of data structure 300 are similar to those of data structure 200 of FIG. 2, but the amount of wasted space has been greatly reduced. This is accomplished by determining a number of rows for the matrix 300 corresponding to a maximum number of fields from each of Types A 308, B 310, or C 312, in accordance with an embodiment of the present invention. Thus, in the non-limiting example shown in FIG. 3, the number of fields 302 is determined to be four, based on the largest number of fields being the four fields 202 of FIG. 2 associated with Type A. As any other Type (e.g., Type B, having two fields, and Type C, having three fields) can be represented in the space of four fields, this allows data structure 300 to avoid allocation of unused space. In accordance with an embodiment of the present invention, each field corresponds to a B-byte data word, where each field is of equal size as the other fields.

As different data is now stored using equivalent fields (e.g., the first field of a Type A vector 308 and the first field of a Type B vector 310), a different mechanism than absolute position is needed in order to distinguish the contents of a particular field. In the naïve implementation of data structure 200 of FIG. 2, it was known a priori that data for a Type B vector 210a was stored strictly in the B fields 204.

In data structure 300, the contents of a particular field of K fields 302 are instead determined based on the type of neuron or connection, in accordance with an embodiment of the present invention. Each column in the matrix represents an instance of a particular type of neuron or connection (i.e., a vector). A column could be represented, by way of example and not limitation, by having a separate array designating the type for each column or by designating the first B-byte word to represent the type and using K+1 rows in the matrix, although one skilled in the relevant arts will appreciate that other ways of designating the type for a particular column may be used. Assignments of each of the K fields 302 to different parameters for a given neuron or connection type is determined by map files, which are generated from neuron or connection definition files, as will be described in further detail below.

An alternative implementation to the data structure 300 of FIG. 3 would be to have separate matrices for each type, representing each unique type by a matrix with a number of rows dependent on the type, or alternatively using an array of structures with a unique structure for each type. However, when copying or moving data there is a need to be aware of the different types of neurons or connections, making the code for managing the data in this alternative implementation more complex. Furthermore, it generally would be necessary to issue a separate copy/move operation for each type. In many architectures, doing block reads (i.e. writing/reading contiguous memory) is significantly more efficient than random reads. Thus, an advantage of the data structure 300 of FIG. 3 is that it is possible to read/write connections or neurons using block reads/writes without needing to have knowledge about their type.

Moreover, data structure 300 of FIG. 3 provides easier lookup of a particular neuron or connection over separate structures for each type. For example, to retrieve the data for the $i^{th}$ neuron or connection, it is found at the $i^{th}$ column of the matrix data structure 300. In contrast, using separate matrices for each type, it would be necessary to know a priori which type of neuron or connection the $i^{th}$ neuron or connection was, and then look it up in the appropriate matrix.

In accordance with an embodiment of the present invention, an algorithm for constructing a mapping, such as shown by data structure 300, is to use hierarchical clustering. Nodes are constructed for each neuron or connection type being mapped. Additionally, a list of unique fields formed from the union of the fields from all neuron or connection types is also constructed. This list of fields is then sorted in ascending order based on the number of types which have each field, in accordance with an embodiment of the present invention.

Hierarchical clustering is then applied to cluster the types and form trees based on this sorted list of fields, in accordance with an embodiment of the present invention. For each field, each of the corresponding neuron or connection types having this field is selected. For each of the selected types, the tree structure is traversed up to the root node to identify all types containing this field. A common parent node is then added to all these root nodes, in accordance with an embodiment of the present invention. As a result, all of the types containing this field are now joined together by a common ancestor, although one skilled in the relevant arts will appreciate that some of the types may already have been in the same tree structure. This new node is then labeled with the field. The aforementioned steps are then repeated until all fields have been processed.

The end result of this clustering is a tree or set of trees, with each tree representing a disjoint set of fields (i.e., the fields in one tree do not belong to any of the types in another tree), in accordance with an embodiment of the present invention.

In accordance with an embodiment of the present invention, each field is assigned to an integer K recursively by the following exemplary non-limiting algorithm:
1. For each of the trees produced in the above initialize K=0.
2. Take the root node of this tree and assign the field associated with this node a value of K (K will be the offset to which the field is mapped).
3. Remove this node from the tree, producing one or more subtrees.
4. If the subtrees just contain the type nodes then stop; processing is complete.
5. Otherwise, recursively process each subtree by setting K to K+1 (i.e remove the subtree's root node, assign the corresponding field to K+1, and repeat this process on the subtrees until the remaining subtrees just contain the type nodes).

One advantage of this algorithm is that fields shared by multiple types are assigned to the same position, in accordance with an embodiment of the present invention, minimizing divergence on a SIMD/SMIT architecture. In a neural network the kernels for connections need access to the fields of its pre- and post-synaptic neurons. In many instances, a number of neuron types will all have a common field, such as "activity." Furthermore, it may be desirable to define a connection that behaves exactly the same between any two neurons containing the field "activity" (e.g a connection that takes the pre-synaptic activity, scales it, and adds it to the post-synaptic activity).

The algorithm above ensures that all types defining the activity of a neuron store the activity in the same location. Thus, when processing this activity connection for a set of neurons, it is possible to perform coordinated reads, where the same position in the buffer is read, by way of example and not limitation, to access the "activity" field for all connections regardless of actual neuron type. Coordinated memory access typically provides improved access speeds on many computer architectures.

V. Ordering of Neurons and Connections

As noted above, the CUDA multiprocessor operated on groups of threads at a time, the groups of threads known as "warps". Parallelism can be exploited, in accordance with an embodiment of the present invention, at the warp level, and at the block level (groups of warps). The efficient parallel processing of threads of a warp, based on the reasons discussed above, is obtained by preventing divergence within any given warp of threads that may cause serialization of operations among the threads. This is accomplished by maintaining the same execution code within each warp.

Figure 4:
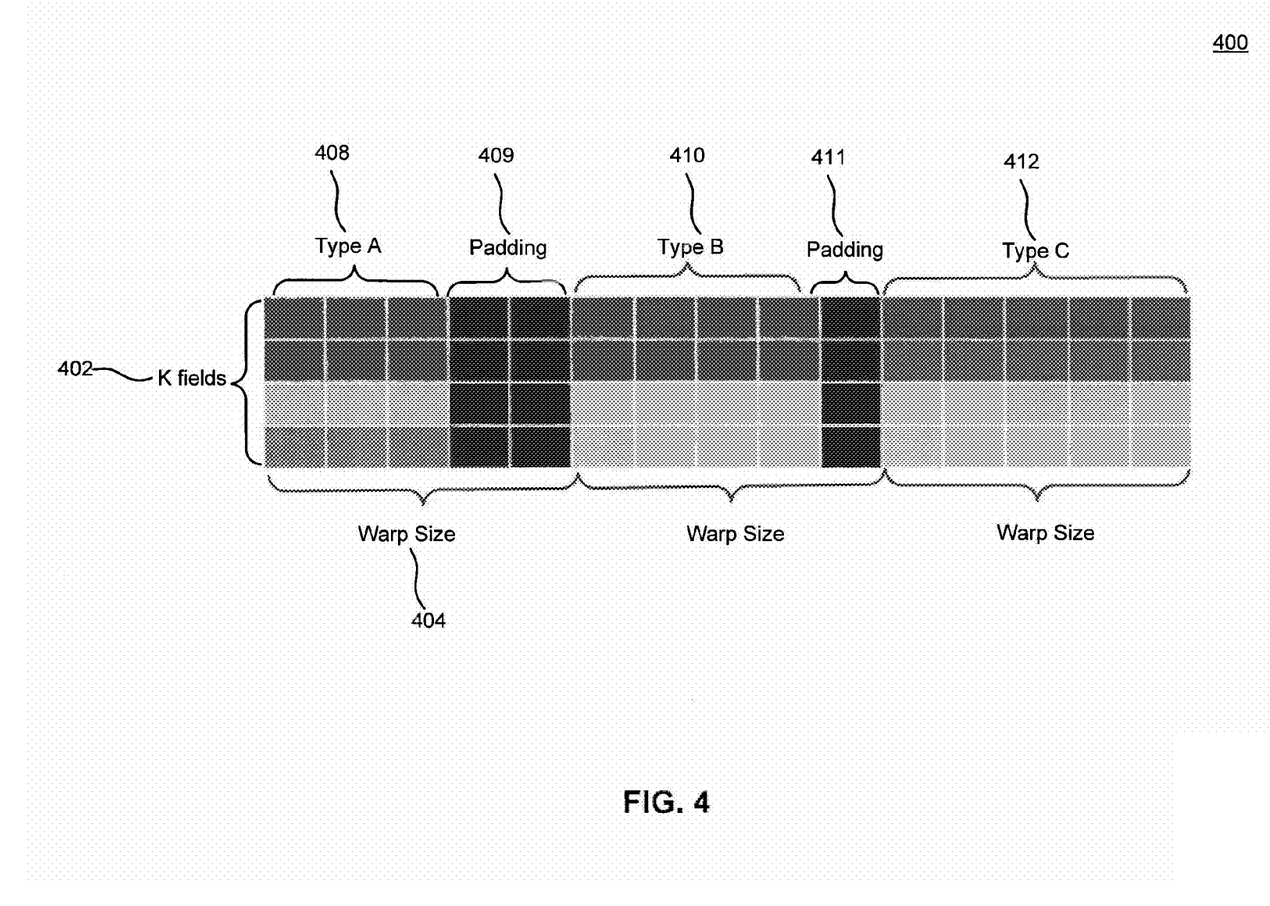
FIG. 4 is a data structure illustrating vector padding to prevent thread divergence within a warp, in accordance with an embodiment of the present invention.

FIG. 4 is a data structure 400 illustrating vector padding to prevent thread divergence within a warp, in accordance with an embodiment of the present invention. By aligning all the neurons or connections (depending on the contents of the data structure 400) of a certain type into groups of the warp size, there will be an implicit guarantee that no neuron processed in any given warp will diverge from the other neurons in that warp. FIG. 4 illustrates how CADE would allocate context specific fields. Black boxes 409 and 411 in FIG. 4 denote virtualized padding. Virtualized padding is accomplished, in accordance with an embodiment of the present invention, through the use of an array "warp_arr" which contains either the index in the data to use, or an invalid value which tells the kernel that this index is used as padding, although one skilled in the relevant arts will recognize that other techniques for indicating to a processing resource that padding is present.

A multiprocessor inside the GPU schedules warps of threads within a block of threads to be executed at a time. The padding scheme of FIG. 4 prevents divergence within a warp by pushing any thread that would not take the same path as all other threads in the current warp up to the next warp. For example, the execution of Type A 408 neurons or connections would diverge from that of Type B 410 neurons or connections. Accordingly, it is desirable to have all of the threads of execution for Type A 408 occur within a single warp, without also having to process any threads of execution for Type B 410.

In the non-limiting exemplary embodiment shown in FIG. 4, a warp size 404 of five threads is depicted, although one skilled in the relevant arts will realize that any warp size 404 can be used based on, for example, the processing resources available to be allocated in parallel. Since there are only three Type A 408 vectors corresponding to individual neurons or connections available for processing, padding 409 is introduced, resulting in the total of Type A 408 vectors and padding 409 being equal to warp size 404. Padding 409 has the effect of pushing execution of Type B 410 neurons or connections to the next warp. Similarly, with four Type B 410 neurons or connections, padding 411 is needed to match the warp size 404 of five, pushing execution of Type C 412 neurons to the next warp.

Below is a non-limiting exemplary code sectopm demonstrating the use of warp_arr and how the virtualized padding would be used:

```
_global_void
updateCell(int number_of_cells, int* cell_types, int* warp_arr) {
    //thread and block information is automatically available
    int local_inx=threadIdx.x+blockIdx.x* blockDim.x;
    if (local_inx<number_of_cells) {
        int cell_inx=warp_arr[local_inx];
        int type=cell_types [cell_inx];
        switch(type) {
        case BASIC_CELL:
            basic_cell_update(cell_inx);
            break;
        case FIRING_THRESH_CELL:
            firing_thresh_cell_update(cell_inx);
            break;
        case PADDING:
            break;
        }
    }
}
```

The above code would be called when processing the neurons and the corresponding function called, e.g. firing_thresh_cell_update, would execute in a homogeneous warp of threads with the same type of neurons, in accordance with an embodiment of the present invention.

Figure 5:
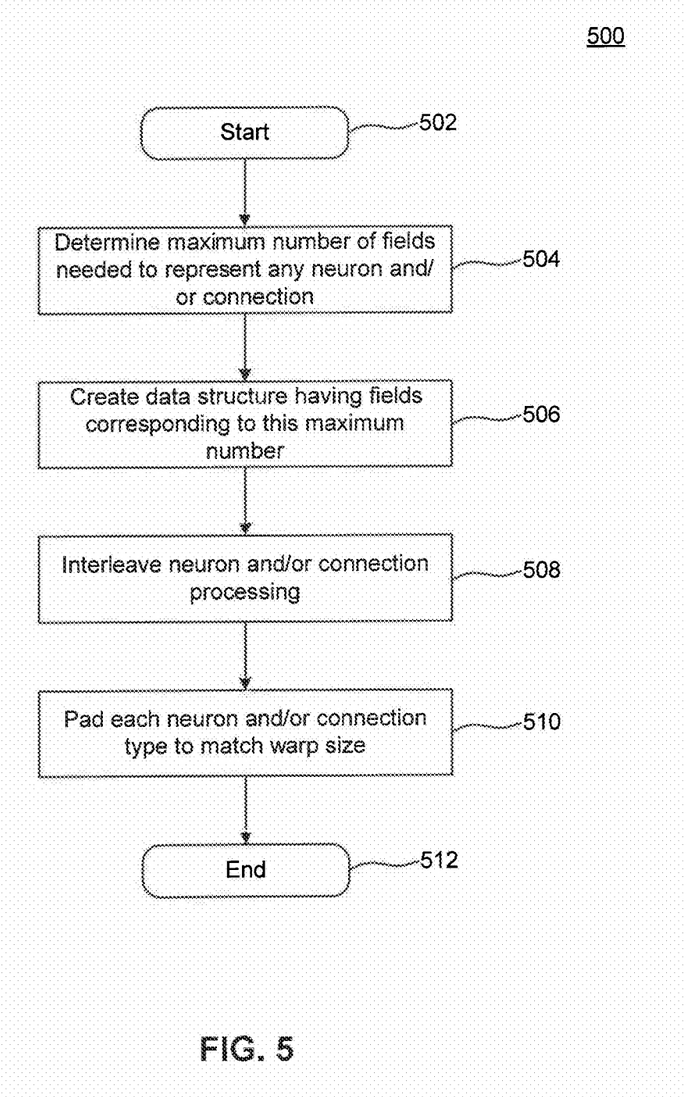
FIG. 5 is a flowchart illustrating steps by which a data structure is allocated, in accordance with an embodiment of the present invention.

FIG. 5 is a flowchart 500 illustrating steps by which data structure 400 of FIG. 4 is allocated, in accordance with an embodiment of the present invention. The method begins at step 502, and proceeds to step 504 where a maximum number of fields needed to represent any neuron or connection is determined. As noted above, in the case of data structure 200 of FIG. 2, the Type A neurons or connections required the use of four A fields 202, whereas only two and three fields were needed by Types B and C, respectively. Accordingly, data structure 300 of FIG. 3 is created, as per step 506, having a number of fields 302 corresponding to this maximum number (four, in the case of FIG. 2).

At step 508, neuron or connection processing is interleaved, by grouping neurons and connections of a same type together (e.g., Type A 408, Type B 410, Type C 412 of FIG. 4), in accordance with an embodiment of the present invention. Then, at step 510, padding 409 and 411 is introduced to each group of neurons or connections, as needed, in order for the sum of the padding and the number of neurons or connections of each type to equal the warp size 404 to prevent thread divergence. The method then ends at step 512.

VI. Data Access Inside Kernels

Now that a data structure like data structure 400 of FIG. 4, with k-fields 402, is being used, a methodology by which to access a neural element's appropriate fields is needed. Each neural update function is type specific, such that the fields and parameters available when updating a particular neuron or connection are fixed, in accordance with an embodiment of the present embodiment. For example, a developer writing a neural update function for a Type A neuron would know that Type A has a field named "activity". However, without some sort of mapping, the developer would not know which field of the k-fields 402 of data structure 400 is being used to store the "activity" data, as it must share the same row of data structure 400 with other fields for other types. As will be described in further detail herein, a set of mechanisms and abstractions are implemented using map files and a runtime API that allow a developer of neural update functions to determine which row in the data structure stores which field needed by the neural update function.

Figure 6:
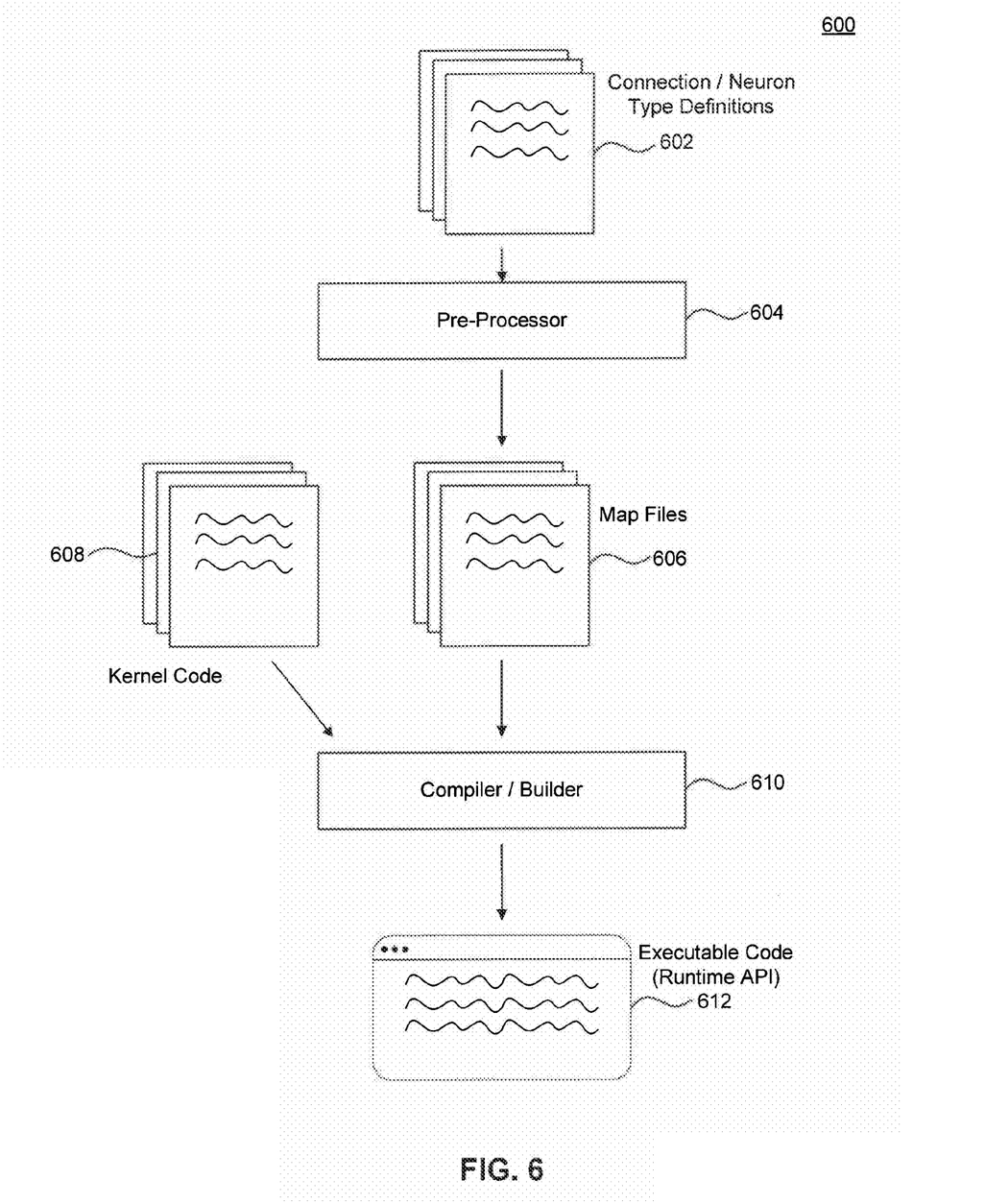
FIG. 6 illustrates a schematic representation of interactions between various elements in an executable build process, in accordance with an embodiment of the present invention.

FIG. 6 illustrates a schematic representation 600 of interactions between various elements in an executable build process, in accordance with an embodiment of the present invention.

For each type of neuron or connection, there is a corresponding definition in a type definition file 602, in accordance with an embodiment of the present invention. This definition assigns some attributes to each type, such as a name. Furthermore, for each type, a list of all the parameters and fields for that type is provided. These fields correspond to values that are stored in the K B-byte words 402 of FIG. 4 allocated to each instance of a neuron or connection.

Each field 402 for a given type is associated with several attributes, such as, by way of example and not limitation, the name for that field, the type, the size in bytes, a default value, etc. One skilled in the relevant arts will appreciate that the exact nature of the data associated with a type will vary depending on a given implementation, and the above attributes are provided by way of example, and not limitation.

In accordance with an embodiment of the present invention, type definitions can be structured similarly to an XML file using a set of nested nodes, where each node has attributes. A non-limiting exemplary abstract representation of how data is stored in a type definition following the notation of an XML file is:

```
<neuron>
<type_name></type_name>
. . . other attributes of a neuron . . .
<field>
    <name>Voltage </name>
    <type>Float32</name>
    . . . other attributes of this field
</field>
. . . other fields
```

```
</neuron>
<conn>
<conn_name>voltage_dependent_conn </conn_name>
<post_type>voltage </post_type>
... other attributes of a connection ...
<field>
    <name>half wave rectified </name>
    <type>bool </type>
    ... other attributes of this field
    </field>
... other fields
</conn>
```

These type definitions 602 are provided to pre-processor 604, in accordance with an embodiment of the present invention. Pre-processor 604 determines the number of K B-byte words needed by identifying the neuron or connection type that uses the most data, as previously discussed in relation to the four A fields 202 of FIG. 2. The pre-processing stage then systematically determines which words in the K word buffer for each neuron or connection type should store which parameters. This information is output from the pre-processing stage in the form of map files 606, in accordance with an embodiment of the present invention.

Map files 606 define which field is stored in which row for each type. Thus, a developer of a neural update function can look at the map files and hard code the row number from the K fields 402 of FIG. 4 into the neural update function. However, a dynamic approach allows for the mapping to change each time pre-processor 604 is executed, and provides additional clarity over hard-coded constants. By accounting for mapping changes, a developer retains the flexibility to add or delete fields for a specific type without the need to re-key hard-coded row number constants.

By way of example, and not limitation, supposing connection Type A has fields a1 and a2, the map files 606 might then specify that a1 is stored in the first B-byte word and a2 is stored in the second B-byte word in the buffers (corresponding to fields 402 of FIG. 4 for each column) allocated to each instance of Type A. A non-limiting exemplary map file using XML-like syntax to provide an abstract illustration of the content of map files 606 would be:

```
<mapconn type=voltage_dependent_conn>
<entry>
    <field_name>have wave rectified </field_name>
    <row>0</row>
</entry>
... other entries for fields ...
</mapconn>
```

In practice, map files 606 would include (i.e., incorporate for compilation) files that can be referenced by kernel code 608, in accordance with an embodiment of the present invention. By way of example, and not limitation, map files 606 can include some C header files defining C preprocessor macros, such as a header file named "voltage_dependent_conn.h", the contents of which could be a macro:

define voltage_dependent_conn 0

For each field name used by the voltage dependent connection there would be a C macro with that name, in accordance with an embodiment of the present invention, the value of which would be the row of the matrix which stored that field. In the above example, the field name "voltage_dependent_conn" can then be used throughout kernel code 608 without the need to know a priori the corresponding row for the field. One skilled in the relevant arts will appreciate that a number of different methodologies for mapping fields for reusable application in kernel code 608 exist, and the aforementioned solution is provided by way of example, and not limitation.

A characteristic of the map files 606 and a runtime API, which provides routines for listing the different types of neurons or connections and the fields associated with each, is that they implement a mapping which maps the field names to the appropriate row in the data structure 400 illustrated in FIG. 4. This mapping allows a developer of a neural update function encoded in kernel code 608 to refer to fields by their name, such as through the use of the name "voltage_dependent_conn" provided by the exemplary macro above. Then, at compile time or runtime, these references by name are automatically converted into the required instructions necessary to read the appropriate row from data structure 400 of FIG. 4.

In the above exemplary map file 606, the kernel code 608 uses macros which in turn use map files' 606 data to determine the appropriate location of a field. Since kernel code 608 has the equations for the corresponding neural element type, it has no need to know which of the k-fields correspond to which field of the neural element, in accordance with an embodiment of the present invention. In kernel code, it is possible to access a field via the following code for a specific neural element i:

int k_offset=ROWMAP(fieldname);
    TYPE(fieldname)     field_name_var=(TYPE(fieldname)) data[k_offset, i];

In the above code segment, ROWMAP and TYPE would be macros that rely on map files 606 to actually determine the appropriate locations of the fieldname in question. If the map file 606 included #defines with the location of field names, e.g.

#define voltage_dependent_conn_offset 0
    #define voltage_dependent_conn_type_str "float"

with voltage_dependent_conn as the field name, then the macros could be written as follows:

#define ROWMAP(X) X ##_offset
    #define TYPE(X) X ##_type_str The specific neural element type kernel code 608 then makes use of the retrieved fields based on whatever equations or other operations are relevant to the data contained in those fields for the particular type corresponding to the kernel code 608. This constitutes the glue by which the runtime determined data structure and field allocation is connected with the generic field-location-agnostic neural element execution code.

The map files 606 and kernel code 608 are combined and used to build the actual executable code 612 through application of compiler/builder 610 (e.g., gcc NVIDIA compiler, gnu linker, etc.), in accordance with an embodiment of the present invention. As noted above, the executable code includes a runtime API, which is a set of objects and functions that can be used at runtime to gain introspection into the neuron or connection types, in accordance with a further embodiment of the present invention. The runtime API provides routines for listing the different types of neurons or connections implemented and the fields associated with each neuron type or connection type. For each field, its name as well as its type can be obtained via the runtime API, by way of example and not limitation. For each neuron, by way of further example and not limitation, a list of allowed connections can be obtained.

Figure 7:
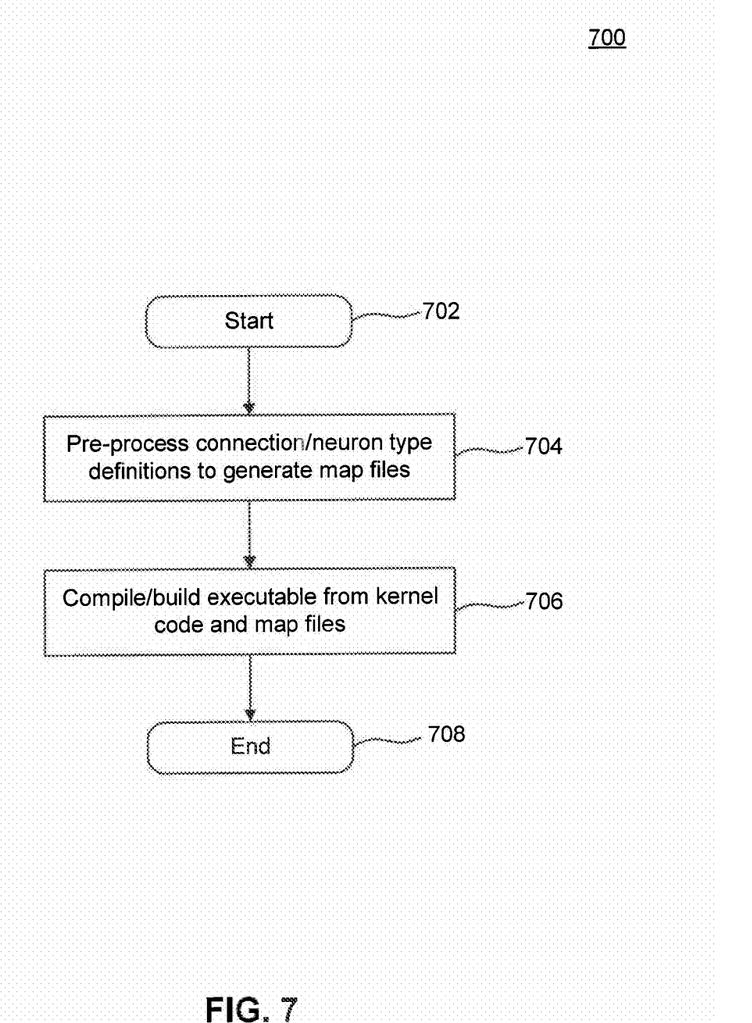
FIG. 7 is a flowchart illustrating the steps by which executable code is created from kernel code and connection or neuron type definitions, in accordance with an embodiment of the present invention.

FIG. 7 is a flowchart 700 illustrating the steps by which executable code is created from kernel code and connection or neuron type definitions, in accordance with an embodiment of the present invention. The method begins at step 702 and proceeds to step 704 where the connection or neuron type definitions 602 of FIG. 6 are pre-processed by pre-processors 604, as described above, in order to generate map files 606, in accordance with an embodiment of the present invention.

At step 706, executable code 612 is compiled and built from kernel code 608 and the generated map files 606, in accordance with an embodiment of the present invention. The kernel code 608 is presented in the form of source files containing code for the neural update functions $k_j$, $g_j$, $h_j$, $\psi_m$, discussed above, in accordance with an embodiment of the present invention. One instance of each neural update function is developed for each type of neuron or connection. To access the data in the data structure 400 of FIG. 4, the kernel code 608 can either use information in the map files 606 or information available at runtime via the runtime API 612, in accordance with an embodiment of the present invention. The method then ends at step 708.

VII. Example Computer System Implementation

Figure 8:
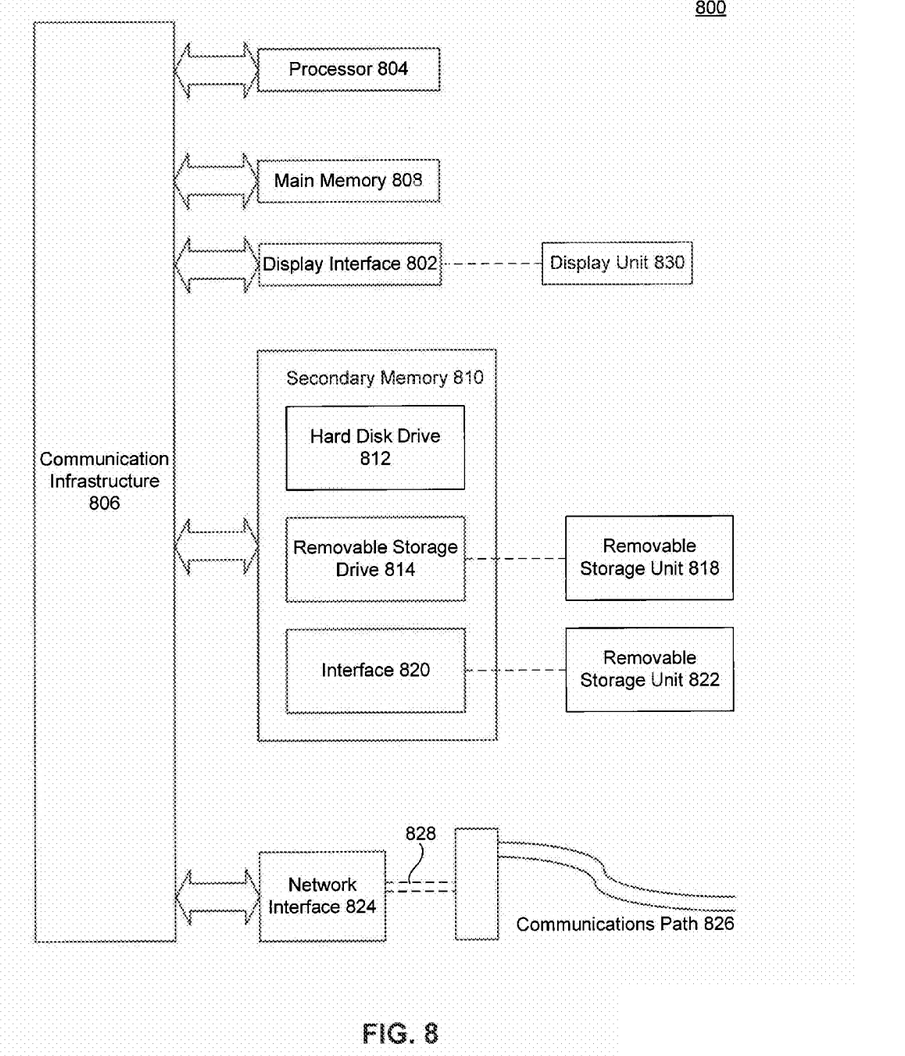
FIG. 8 depicts an example computer system in which embodiments of the present invention may be implemented.

Various aspects of the present invention can be implemented by software, firmware, hardware, or a combination thereof. FIG. 8 illustrates an example computer system 800 in which the present invention, or portions thereof, can be implemented as computer-readable code. For example, the methods illustrated by flowcharts 500 of FIG. 5, 600 of FIGS. 6, and 700 of FIG. 7, can be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. that is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 that allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals that may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowcharts 500 of FIG. 5, 600 of FIGS. 6, and 700 of FIG. 7, discussed above. Accordingly, such computer programs represent controllers of the computer system 800. Where the invention is implemented using software, the software may be stored in a computer program product and loaded into computer system 800 using removable storage drive 814, interface 820, hard drive 812 or communications interface 824.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VIII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method of organizing one or more data structures in physical storage media for efficient access by a parallel processing architecture, the method being implemented in a computer system that includes a physical processor and physical storage media, the method comprising:
   determining the number of pre-synaptic connections for individual ones of a set of neurons, the set of neurons being connected through a set of connections, wherein the set of neurons includes a first neuron and a second neuron;
   grouping, by the physical processor, individual ones of a set of neurons together in a set of groups based on the determined number of pre-synaptic connections per neuron such that individual ones of the set of groups include neurons having the same number of re-synaptic connections, wherein the set of groups includes a first group and a second group, wherein the first group includes the first neuron and the second neuron; and
   processing the set of neurons by evaluating connections in parallel per group such that a first connection of the first neuron is evaluated in parallel with the first connection of the second neuron.

2. The method of claim 1, wherein individual neurons are associated with one or more fields of data that are needed to process neurons, wherein individual fields correspond to a fixed amount of physical storage media, the method further comprising:
   determining the number of fields of data associated with individual ones of the set of neurons;
   determining a maximum number of fields of data such that individual ones of the set of neurons are associated with at most the maximum number of fields;
   forming a data structure by an allocation of physical storage media for individual ones of the set of neurons based on the determined maximum number of fields; and
   storing the fields associated with the set of neurons in the data structure,
   wherein processing the set of neurons includes accessing the data structure.

3. The method of claim 2, further comprising:
   determining a maximum number of connections for individual ones of the set of neurons such that individual ones of the set of neurons are connected through at most the maximum number of connections,
   wherein the allocation includes padding based on the determined maximum number of connections.

4. The method of claim 3, wherein the padding is performed such that one or more parameters indicative of efficiency of accessing the physical storage media are improved in comparison to an allocation of physical storage media without padding.

5. The method of claim 1, wherein the set of neurons further includes a third neuron and a fourth neuron, wherein the second group includes the third neuron and the fourth neuron, wherein processing the set of neurons is performed by evaluating the first group in parallel with the second group such that a first connection of the first neuron is evaluated in parallel with the first connection of the third neuron.

6. The method of claim 5, wherein individual ones of the set of neurons are associated with a neuron type, wherein grouping individual ones of a set of neurons together in a set of groups is performed such that individual ones of the set of groups include neurons having the same neuron type.

7. A computer-implemented method of organizing one or more data structure in physical storage media for efficient access by a parallel processing architecture, the method being implemented in a computer system that includes a physical processor and physical storage media, the method comprising:
   determining a number of fields of data associated with individual ones of a set of neurons, wherein fields are needed to process neurons, wherein individual ones of the set of neurons are associated with a neuron type;
   determining a maximum number of fields of data such that individual ones of the set of neurons are associated with at most the maximum number of fields;
   grouping, by the physical processor, individual ones of a set of neurons together in a set of groups such that individual ones of the set of groups include neurons having the same neuron type and the same number of pre-synaptic connections,
   forming a data structure by an allocation of physical storage media for an individual group based on the determined maximum number of fields, wherein the allocation includes padding based on the number of pre-synaptic connections for neurons in the individual group, and furthermore repeating allocation for individual ones of the set of groups;
   storing the fields associated with the set of neurons in the data structure; and
   processing the set of neurons by evaluating connections in parallel per group, wherein processing the set of neurons includes accessing the data structure.

8. The method of claim 7, further comprising:
   generating a map file from a type definition associating individual ones of the set of neurons with fields, the map file configured to allocate positions in the data structure to the fields; and
   building executable code from kernel code and the map file.

* * * * *